May 31, 1938.    B. G. OLVING    2,119,113
ELECTRIC CONDENSER CONSTRUCTION
Filed Nov. 25, 1933    8 Sheets-Sheet 3

INVENTOR
*Bror G. Olving*
BY
*Blair, Curtis, & Dunne*
ATTORNEYS

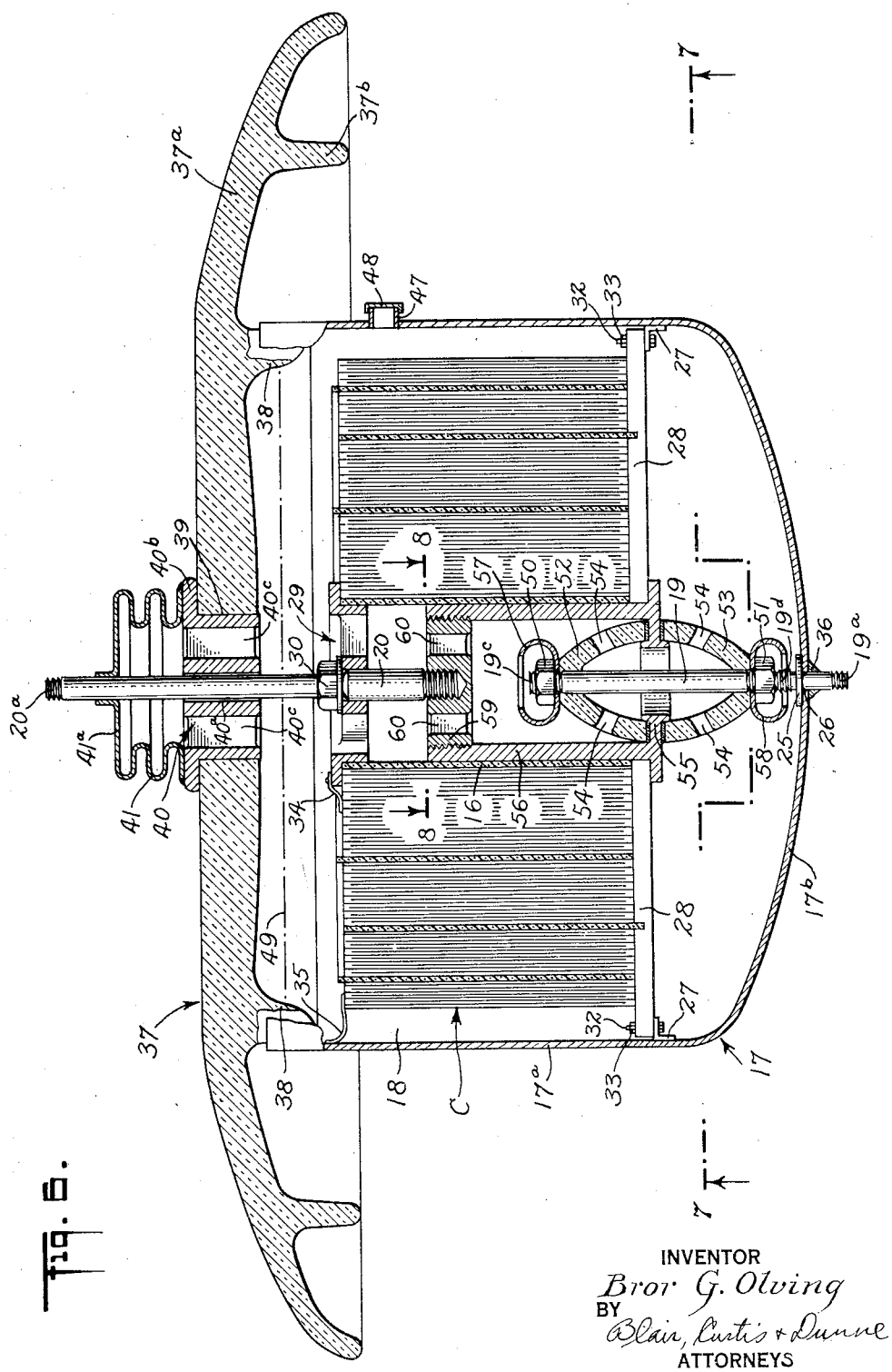

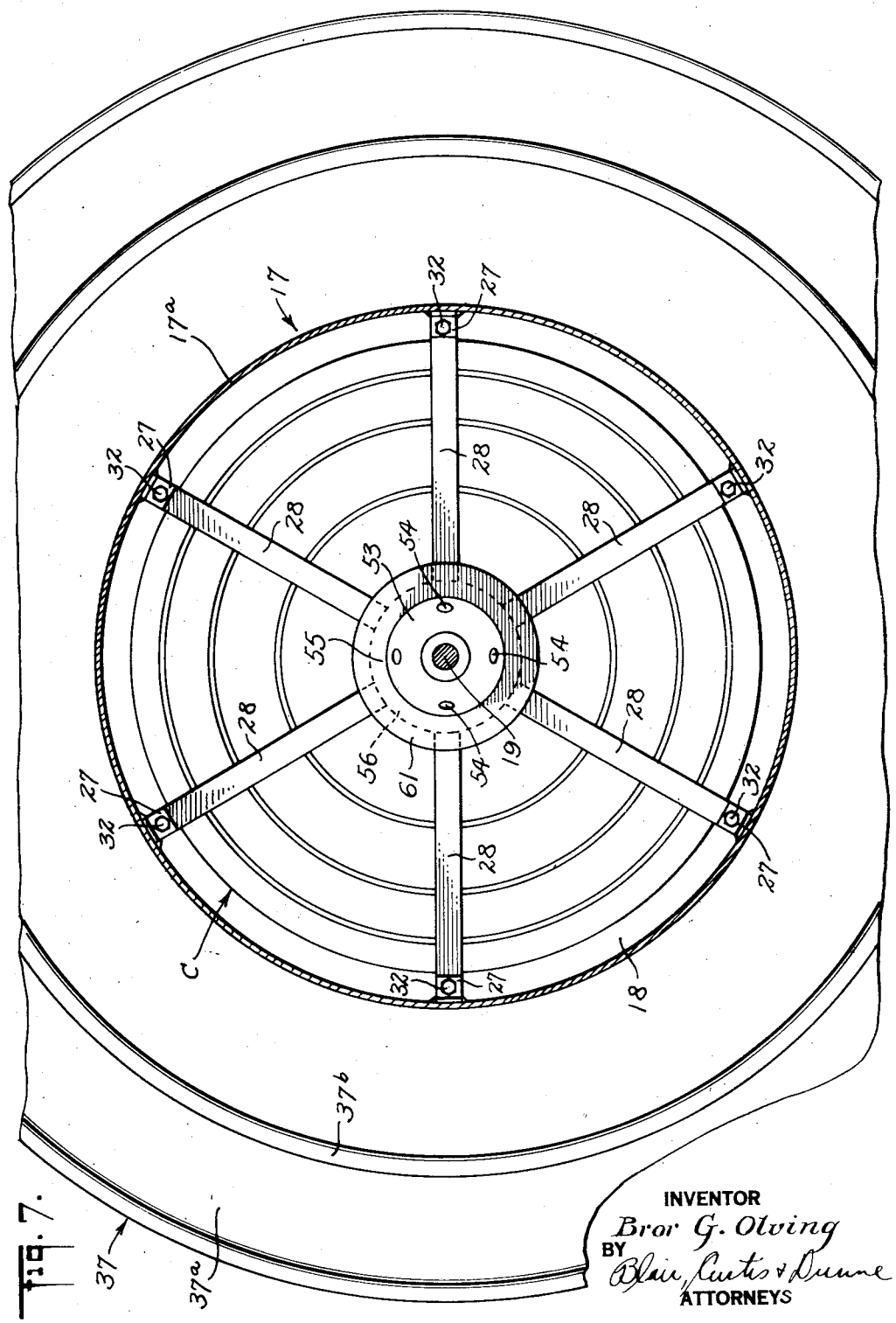

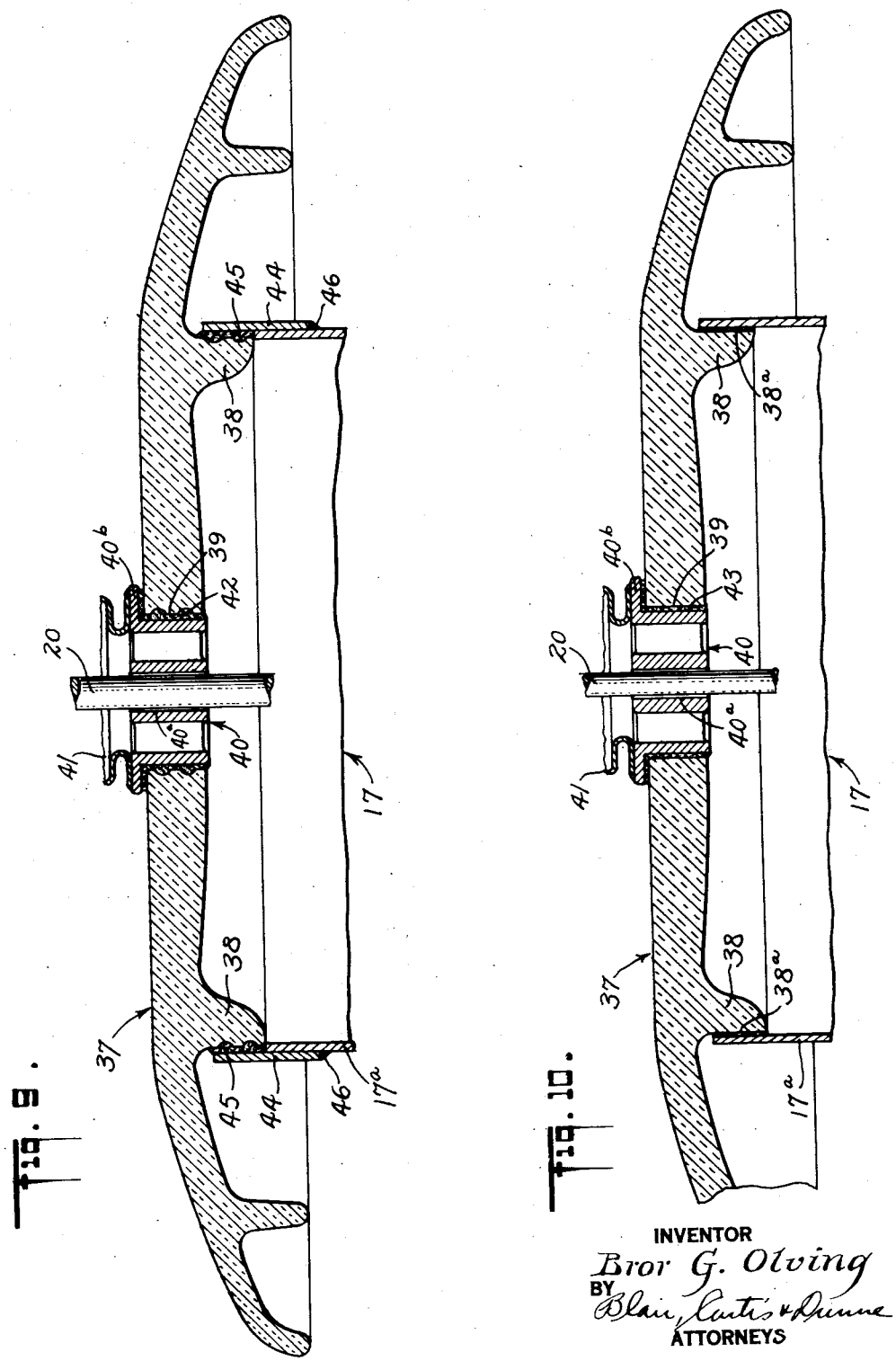

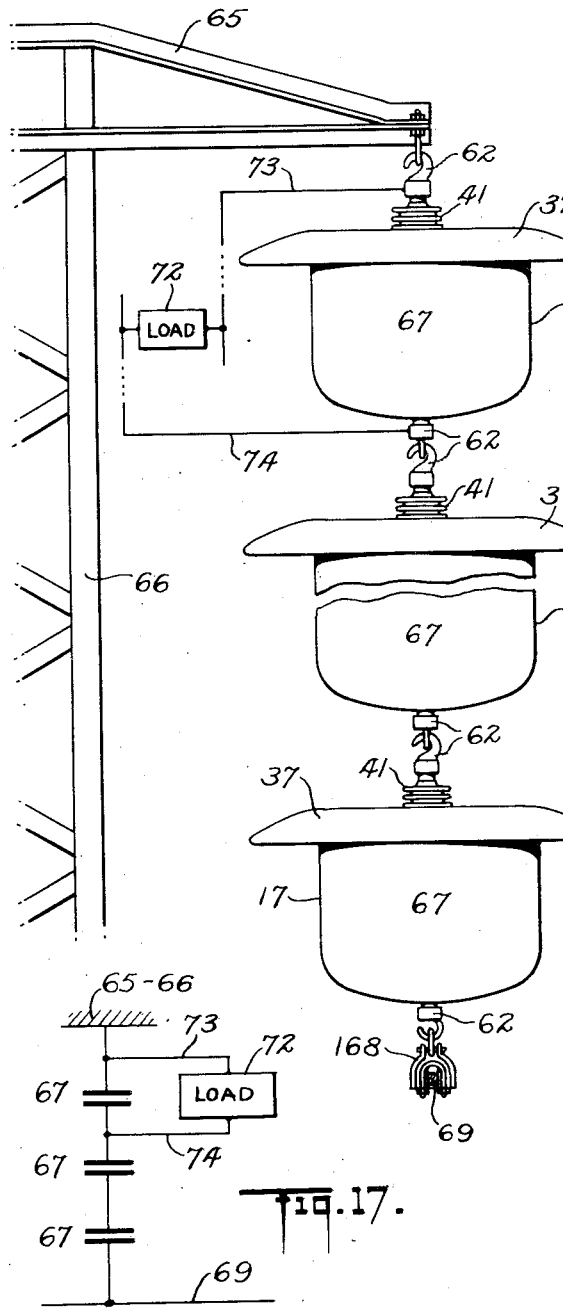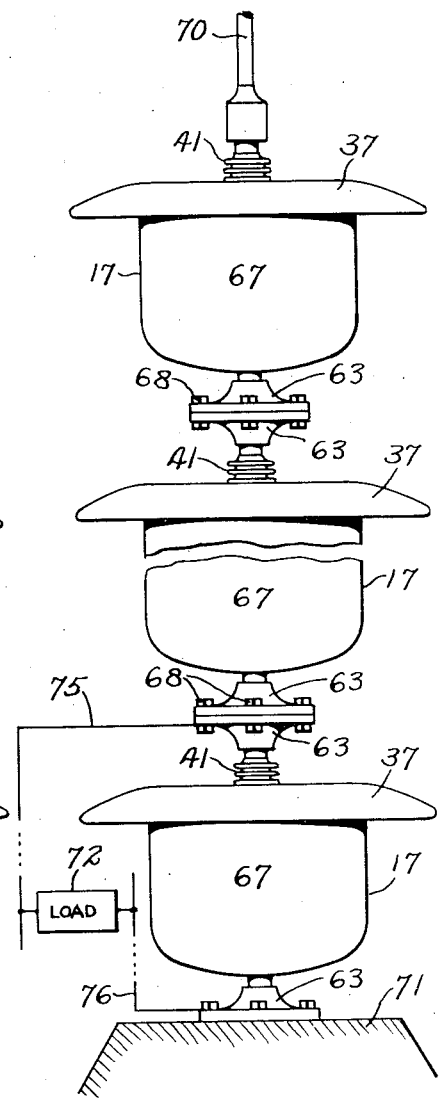

May 31, 1938. B. G. OLVING 2,119,113
ELECTRIC CONDENSER CONSTRUCTION
Filed Nov. 25, 1933 8 Sheets-Sheet 8

INVENTOR
Bror G. Olving
BY
Blair, Curtis & Dunne
ATTORNEYS

Patented May 31, 1938

2,119,113

UNITED STATES PATENT OFFICE 2,119,113

ELECTRIC CONDENSER CONSTRUCTION

Bror G. Olving, Hamden, Conn., assignor to Products Protection Corporation, a corporation of Delaware Application November 25, 1933, Serial No. 699,666

19 Claims. (Cl. 175—41)

This invention relates to capacitor or electric condenser construction and more particularly to high voltage capacitor construction.

One of the objects of this invention is to provide a thoroughly practical and durable capacitor construction and one which will be well adapted to give long continued and dependable service in use. Another object is to provide a construction of the above-mentioned character that will lend itself to inexpensive and rapid manufacture and to flexibility and ease of installation. Another object is to provide a capacitor construction well adapted to meet the widely varying requirements or conditions of use met with, particularly in high voltage systems and circuits. Another object is to provide a high voltage capacitor construction that can be embodied in forms of large ratings, and thus circumvent the various heretofore existing limitations in the construction and practical application of capacitors in particularly high voltage systems and circuits.

Another object is to provide a capacitor construction of the above-mentioned character that will be of efficient mechanical and electrical action, compact, and of high mechanical and electrical dependability and durability. Another object is to provide a capacitor construction in which maintenance and/or servicing costs are substantially eliminated. Another object is to provide a construction of the above-mentioned character that will be well adapted for long-continued and dependable use in outdoor installations, particularly in connection with high voltage transmission lines and related circuits and apparatus. Another object is to provide a capacitor of the above-mentioned nature in which dependable insulation is initially achieved and reliably maintained throughout long continued use. Another object is to provide a capacitor unit construction realizing such objects as those noted above and that will lend itself to wide flexibility of practical installation as well as of purpose or applicability of use. Other objects will be in part obvious or in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings in which are shown several of the various possible embodiments of my invention, Figure 1 is a vertical central sectional view of a capacitor unit;

Figure 6 is a vertical central sectional view, like that of Figure 1, showing another or modified form of certain features of my invention;

Figure 7 is a horizontal sectional view as seen along the line 7—7 of Figure 6;

Figure 9 is a fragmentary vertical sectional view showing the details of one form of mechanical seal or connection between certain insulating and metallic parts of the construction;

Figure 10 is a similar fragmentary vertical sectional view showing another form of such seal or connection;

Figure 15 is a side elevation, on a smaller scale, of one possible form of installation of capacitor construction, and Figure 16 is a similar view of another possible form of installation.

Figure 17 is an electrical diagram typifying the circuit arrangement resulting from the arrangements of Figures 15 or 16;

Similar reference characters refer to similar parts throughout the several views of the drawings.

As conducive to a clearer understanding of certain aspects and features of my invention, it might at this point be noted that the present-day high voltage transmission lines open a relatively wide field of use to condenser or capacitor installations, the latter being capable of functioning for purposes of power factor correction, surge absorbers, protection against lightning, and other transients, voltage regulation, couplings of circuits to the transmission line, for voltage stepdown, and the like, but the existing demand or need for condenser or capacitor constructions to function in capacities such as those just mentioned has heretofore remained unfilled because available types of capacitors, rated, for example, up to 6900 volts, are not applicable to high tension transmission lines or circuits, the ratings of which range from 11 kilovolts to or beyond 220 kilovolts; moreover, what attempts have heretofore been made to develop higher voltage capacitors for transmission line applications have resulted only in capacitors having inherent limitations, such as, for example, mechanical limitations as to result in confining such capacitors to relatively small ratings, with corresponding limitations as to applicability, use or adaptability in the above-mentioned wide field of possible use. One of the dominant aims of this invention is to circumvent such limitations and to provide a high voltage capacitor construction of large rating, thus making it possible to reliably fill the large need existing in the high voltage transmission field.

Figure 1:
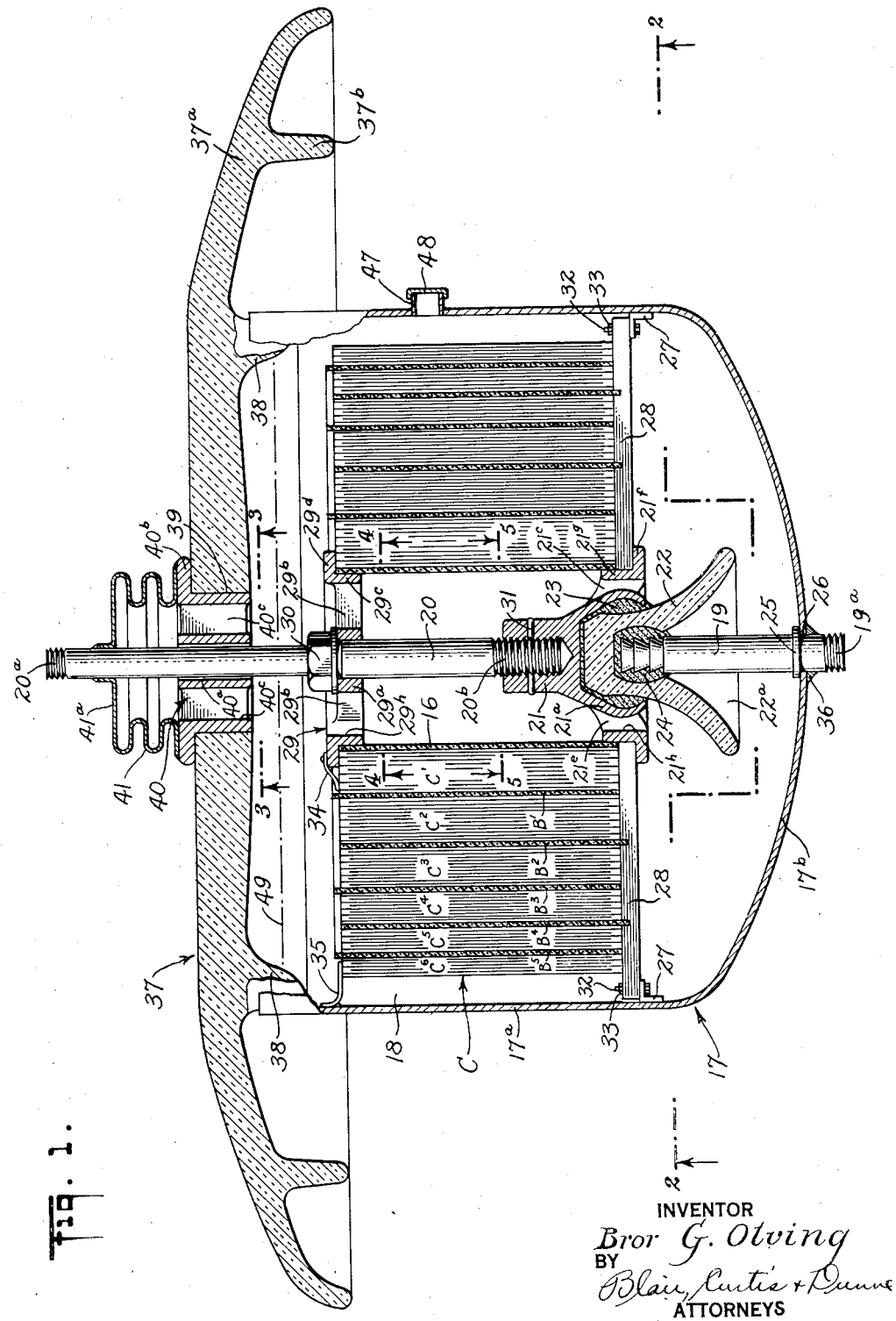

Referring now to the drawings and more particularly to Figure 1, I have there shown a capacitor unit in which the electrical capacitance is provided for an electrostatic condenser unit C preferably, and for purposes more clearly described hereinafter, of annular shape. Conveniently and preferably the electrotatic condenser unit C is made up of a plurality of concentric superimposed sections, illustratively six in number, being indicated in Figure 1 at $C^1$, $C^2$, $C^3$, $C^4$, $C^5$ and $C^6$, preferably and illustratively connected in series.

Illustratively these annular condenser sections are made up of alternated metal foil strips interleaved with strips of insulation, such as paper, and conveniently and preferably these strips are wound spirally in any suitable manner. In such case the strips of condenser sections $C^1$ are wound directly upon an insulating cylinder or tube 16, the winding of succeeding sections continuing but preferably with the interposing, between sections, of suitable insulating barriers such as are indicated in Figure 1 at $B^1$, $B^2$, $B^3$, $B^4$ and $B^5$. In so far as the details of construction of these condenser sections are concerned, they are per se not part of this present invention and may take the forms described and shown in my co-pending application Serial No. 660,082, filed March 9, 1933. The condenser sections, as above noted, are connected in series and preferably they are so proportioned as to the number of turns of foil strips that their individual electrostatic capacities are equal.

The condenser C thus provided and annular in shape is enclosed in an enclosure which includes a metal tank or casing 17 generally and preferably cylindrical in shape, having therefore a cylindrical side wall $17^a$ and an outwardly convex bottom wall $17^b$. The condenser C is, by means hereinafter described, held within the casing 17 so that its axis is coincident with the axis of the casing 17, the outside diameter of the condenser C being less than the inside diameter of the casing 17, thus to provide an outer annular passage or channel 18, for a purpose described hereinafter.

Considering now the manner in which the condenser C is supported within the enclosure, I first provide a lower metal rod 19 (Figure 1) and an upper metal rod 20, axially alined and mechanically but insulatingly connected in a manner to withstand substantial stresses, particularly tensional stresses. For this purpose as well as to provide a lower support for the condenser C, I provide a metal member 21 whose upper portion is interiorly threaded to receive the lower threaded end $20^b$ of the upper rod 20; from the upper portion of the member 21, the latter tapers outwardly and downwardly to provide a socket-like portion $21^a$, open from the under side thereof, for the reception of an insulator 22.

The insulator 22 is made of any suitable dielectric material, illustratively porcelain, and its upper outside surface and the inner surface of the socket portion $21^a$ are suitably shaped or recessed to receive therebetween a suitable cement 23. The insulator 22, bell-shaped or skirted as at $22^a$, has a suitable recess in its main body portion, open from the bottom, to receive the upper end of the lower rod 19, the walls of the recess and the upper end of the rod 19 being suitably shaped or grooved to receive therebetween a suitable cement indicated at 24.

These three parts 21, 22 and 19 are thus bonded by the cement interposed therebetween, the cement interlocking the three parts so as to provide joints capable of withstanding substantial stresses. The bonds or joints thus accomplished may be achieved by appropriate treatment of a suitable cement, illustratively Portland cement, in any well known manner, the bonds or joints producing a mechanical connection of high tensile strength and capable of safely withstanding stresses of many thousand pounds. Inasmuch as various methods of achieving such bonds of high tensile strength are well known, the details thereof are not herein set forth.

The insulator 22 is dimensioned to satisfactorily insulate the metal part 21 and related parts from the lower rod 19 and related parts for the maximum voltage that may be impressed across the condenser C.

Figure 5:
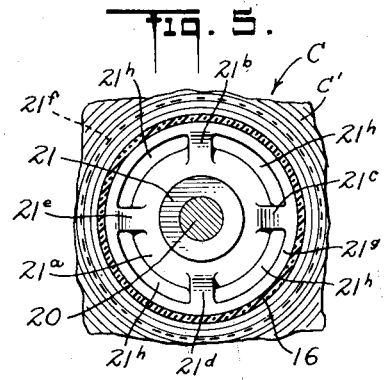
Figure 5 is a plan view substantially as seen along the line 5—5 of Figure 1 of another supporting member.

The metal part 21 is provided with a plurality of outwardly and downwardly directed arms (see Fig. 5), illustratively four in number, being indicated in Figure 5 at $21^b$, $21^c$, $21^d$ and $21^e$, and they support at their outer ends and have integrally formed therewith a supporting ring that is L-shaped in cross-section and provides a horizontal flange $21^f$ and a vertical flange $21^g$ into the angle between which the annular condenser C is adapted to be received and seated, as will be more fully described hereinafter.

Adjacent its lower end the lower rod 19 is provided with a collar 25 which, for purposes of assembly particularly, is intended to limit the extent to which the rod 19 may be passed through a central opening 26 in the bottom wall $17^b$ of the casing 17.

After rods 19 and 20 have been mechanically and insulatingly interconnected as above described, the assembled rods 19—20 are inserted into the casing 17, the lower end of rod 19 passing through the hole 26 until stopped by the collar 25, thus fixing the height of the plane of the upper face of the ring flange $21^f$ of the member 21 above the bottom wall $17^b$. Thereupon a suitable number, illustratively six, of L-shaped supporting brackets 27 (see Figures 1 and 2) are equidistantly spaced about the inside side wall 17ª of the casing 17 and welded thereto, being positioned so that their upper supporting surfaces fall in the horizontal plane through the upper surface of the ring flange 21ᶠ whose height above the bottom has been determined, as above noted, by the collar 25. In this manner, by the use of the collar 25, proper positioning of the side brackets 27 with respect to the supporting flange 21ᶠ of the member 21 is dependably achieved and thus, in the construction of successive units, the variations that might be introduced by the cementing or bonding of the metal parts 21 and 19 to the insulator 22 are prevented from effecting misalinement of the condenser supporting parts.

The rod assembly 19—20 may thereupon be removed from the casing 17, and now the annular condenser C may be slipped down over the rod 20, the vertical supporting flange 21ᵍ being received within the insulating tubular core 16 of the condenser C. Interposed between the under face of the condenser C and the horizontal ring flange 21ᶠ (Figure 1) is a plurality of combined insulating spacers and supports, taking the form of bars of suitable dielectric material and corresponding in number to the number of inside side brackets 27 within the casing 17 (see Figure 2). Illustratively, therefore, these insulating members are six in number, extending radially along the under face of the annular condenser C, being designated in Figures 1 and 2 by the reference character 28.

As better appears in Figure 1, alternate barriers project downwardly and into the insulating members 28, the latter being suitably recessed for this purpose.

Figure 4:
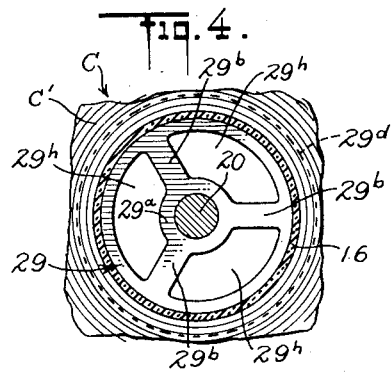
Figure 4 is a plan view as seen substantially along the line 4—4 of Figure 1 of a supporting member.

Next I slip over the rod 20 a coacting supporting member, generally indicated at 29, for engaging the upper portion of the condenser C; member 29, shown also in Figure 4, has a central hub 29ª that surrounds the rod 20 and extending radially from the hub 29ª is a plurality of arms 29ᵇ, illustratively three in number, supporting at their outer ends and having integrally formed therewith, a ring member having a vertically extending flange 29ᶜ which is received within the insulating tubular core 16 of the condenser C and a horizontally extending flange 29ᵈ which rests against the upper end face of the core tube 16 and of the condenser C.

The upper portion of the rod 20 is suitably stepped and at an intermediate portion is threaded to receive a nut 30 by which supporting members 29 and 21 are drawn toward each other and the condenser C and its tubular core 16 securely clamped therebetween, the threaded connection between rod 20 and the member 21 having previously been locked against unthreading as by the pin 31.

Figure 2:
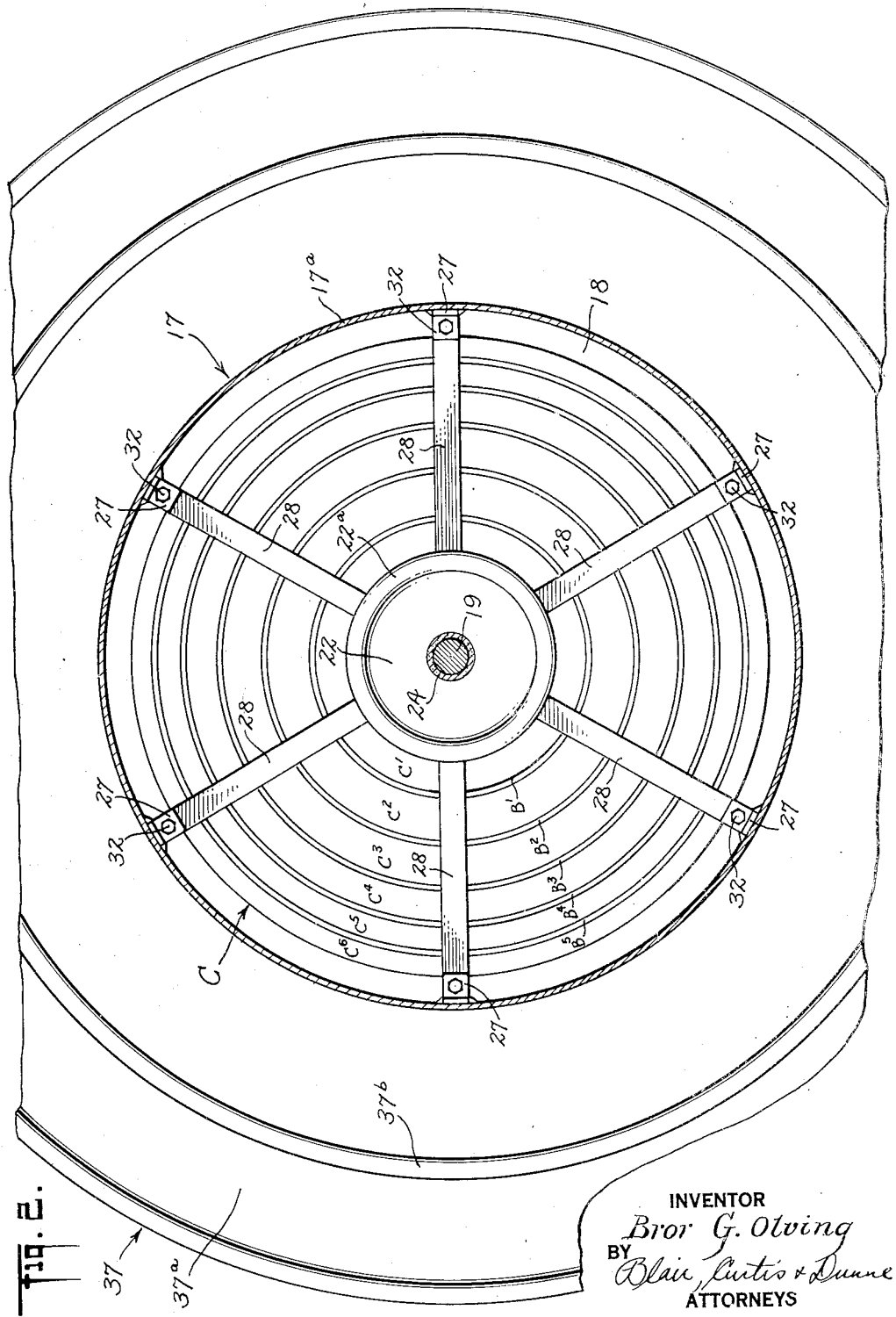
Figure 2 is a horizontal sectional view as seen along the line 2—2 of Figure 1.

The rod assembly 19—20 with the condenser C thus clamped thereon is now let down into the casing 17, the lower end of rod 19, threaded as at 19ª, passing through the hole 26 in the bottom wall 17ᵇ and projecting away therefrom while the outermost ends of the six insulating spacer beams 28 come to rest respectively upon the upper faces of the inside brackets 27 (see Figures 1 and 2). Moreover, each of these inside brackets 27 is provided with an upstanding threaded stud 32 and these studs 32 in the assembly as thus described, pass through suitable holes provided in the respective outer ends of the insulating beams 28. Thereupon nuts 33 (Figures 1 and 2) are threaded onto the studs 32 and thus the outer ends of the insulating beams 28 are securely clamped in position, it being noted that the inner ends of these beams 28 are securely clamped between the horizontal ring flange 21ᶠ and the tubular core 16 of the condenser C.

One terminal of the condenser C is now connected, as by a conductor or jumper 34 (Figure 1) to the metallic member 29, thus electrically connecting that terminal of the condenser C to the rod 20 which, as above described, is insulated from the lower rod 19. The other terminal of the condenser C is connected as by a jumper 35 to the metal tank or casing 17 which is at the same potential as the lower rod 19, the latter being welded as at 36 to the bottom wall 17ᵇ, thus hermetically sealing the opening 26 in the latter.

The apparatus may now be provided with its closure; for closing the casing 17 I provide a relatively large disk-like member generally indicated at 37 (Figures 1 and 2), made of any suitable solid dielectric material, preferably a ceramic material like porcelain. On its under side, the combined closure disk and insulator 37 is provided with a flange 38 in sealed connection with the upper end of the cylindrical casing wall 17ª and provided at its center with a relatively large hole 39 in which is seated and sealed thereto a metal member generally indicated at 40.

Figure 3:
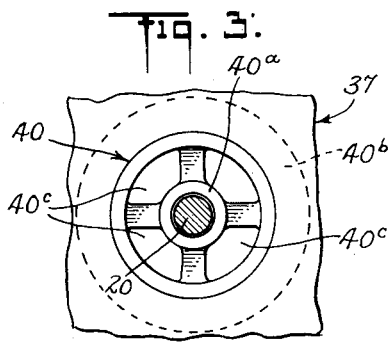
Figure 3 is a plan view, substantially as seen along the line 3—3 of Figure 1, of a part of the closure means of the capacitor unit.

Member 40 is in general disk-shaped (see Figure 3) being made of any suitable metal, and it is provided with a central opening 40ª of slightly larger diameter than the upper end of the upper rod 20, so that relative axial movement, when assembled, between these two parts may freely take place. It has an upper peripheral horizontally extending flange 40ᵇ that overlaps the upper surface of the insulating cover 37 and to which is united, as by brazing, soldering, welding, or the like, a corrugated sheet metal bellows 41 whose upper wall 41ª is provided with a central hole, preferably surrounded by a collar, as shown in Figure 1, adapted snugly to receive the upper end of the upper rod 20. The metal disk member 40 is provided with suitable apertures 40ᶜ (Figure 3) so that, when the assembly is completed, the interior of the sealed enclosure 17—37 will be in communication with the interior of the bellows 41.

The thus assembled cover 37, disk member 40, and bellows 41, are now slipped over the upwardly projecting end of the rod 20, the seal between the flange 38 and the casing 17 completed and the upper wall 41ª sealed to the rod 20, as by soldering, brazing, welding, or the like, thus leaving projecting upwardly from the thus far assembled construction the uppermost and threaded end portion 20ª of the upper rod 20.

Considering now the manner in which the seal between the metal disk 40 and the insulating cover 37 may be accomplished, reference may first be made to Figure 9 in which I have shown the contiguous surfaces of the disk member 40 and of the insulating cover 37 recessed or grooved and otherwise suitably spaced to receive therebetween a cement indicated at 42, the cement being of any suitable character for bonding the metal disk 40 to the ceramic material of the insulating cover 37, suitable heat treatment being given the parts and the cement, depending upon which of well-known methods of bonding such parts as these together is employed. Where high temperature heat treatment is necessary, it will be noted that the heat treatment may be given the parts 40 and 39 prior to the assembly thereto of other parts and prior to the assembly therewith of any other parts.

As illustrative of another method of effecting a sealed joint between the parts 40 and 37, reference may be made to Figure 10 in which I have indicated at 43 a metallic seal between these two parts. For example, throughout the area represented by the line 43, there is secured to the ceramic closure 37 a film of a suitable metal such as solder, lead, tin, aluminum, or the like, achieved by any well-known method, such as by electrolytic deposition or by kiln-firing. A similar coating or film of similar metal is deposited upon the outer surfaces of the disk member 40 throughout those portions thereof as will contact with the closure member 37. The two parts 40 and 37, with the thus deposited metallic films, are mechanically assembled to bring the two films or layers of metal into contact with each other whereupon the two parts are heated in any suitable manner to bring the metal of the films to the melting point and thus fuse them together.

As I have above mentioned, the insulating closure 37 is sealed to the casing 17; this seal may be achieved in any suitable manner and in Figure 9 and 10 I have shown illustratively two possible ways of bringing about a hermetic seal between these two parts.

Referring hence first to Figure 10, the joint between the flange 38 and the upper portions of the cylindrical side walls 17ª of the casing 17 may be achieved as was just above described in connection with Figure 10 in achieving the sealed joint between the metal disk member 40 and the closure member 37. For example, there is deposited upon the outer peripheral or cylindrical face 38ª of the flange 38, a film of metal, such as solder, lead, tin, or aluminum, for example, by any known method such as by electrolytic deposition or by kiln-firing. A similar film of metal is deposited or applied to the upper inside surface of the cylindrical side wall 17ª, the latter being of metal anyway. With the closure member 37 related to the casing 17 and hence with the flange 38 on the former being snugly received and fitted within the upper end of the latter, thus bringing the two metal films contiguous to each other, heat is applied to the parts, preferably by heating the upper outer portions of the casing 17, to bring the two metal films to their melting point and to fuse them together.

The other illustrative method of achieving this sealed joint is indicated in Figure 9 wherein the flange 38 on the porcelain closure 37 is fitted into a metal band 44 and cemented thereto as at 45 by a cement and process as was above described in connection with Figure 9 for achieving a sealed joint between the disk member 40 and the closure member 37. This relation of these two parts permits more convenient and ready handling particularly in the course of the high temperature heat treatments some times necessary in effecting this type of sealed joint.

The metal band member 44 is of an inside diameter slightly in excess of the outside diameter of the cylindrical portion 17ª of the casing 17, so that the one may be snugly fitted over the other, as shown in Figure 9. When so fitted together, in the course of the process of the assembly of the parts as already above described, the metallic band 22 is brazed or welded, preferably welded, to the casing wall 17ª, as is indicated at 46 in Figure 9. The joint 46 and the joint 45 are both, as will now be clear, sealed joints.

Thus the condenser C becomes reliably sealed within the enclosure 17—37, certain unique coactions between various of the parts already above described taking place as is more clearly set forth later hereinafter.

At a suitable point in the metal casing 17, as in the side wall 17ª thereof, I provide a pipe connection or nipple 47 through which access to the interior may be gained for purposes of treatment of the condenser C, such as pumping out moisture, drying, impregnating, and the like, and through which, also, and preferably, a liquid dielectric medium is injected into the enclosure, whereupon the pipe connection 47 may be sealed as by the plug or cap 48. In Figure 1 I have indicated by the line 49 the level to which the liquid dielectric, such as a suitable insulating oil, is injected into the condenser construction. Here again, certain unique coactions take place but these will be more fully later described hereinafter.

As for still other coactions it may at this point be noted that the mechanical interrelation of parts above described makes it possible to mount or suspend the capacitor construction by means of the upper and lower rods 20 and 19, respectively, without subjecting other parts to any strains or stresses; in particular, the casing 17 and more particularly the insulating cover 37, even though the composite rod construction 19—20 passes therethrough, are not subjected to any forces of tension or compression to which the rod assembly 20—19 may be subjected. For example, the bellows 41, while maintaining a sealed joint, at the same time permits relative movement between the rod assembly 19—20 and the closure member 37 with its metallic disk 40 to take place in an axial direction since the upper rod 20 is slidably fitted or received through the hole 40ª in the metal disk 40. The threaded ends 20ª and 19ª of the rods 20 and 19 respectively projecting above and below the assembled construction, are for the purpose of attaching thereto suitable securing or mounting devices, as will be more clearly hereinafter described. The rod assembly 19—20, with interposed insulator 22, is particularly adapted to function as a compression member though, as will now be clear, it can be subjected to substantial tensional strains.

However, where the condenser unit is to be employed in a relation such that the rod assembly is intended in the main to function as a tension member, I may employ a construction like that shown in Figure 6, to which reference may now be made.

In Figure 6 the upper rod 20 and the lower rod 19 are mechanically and insulatingly joined. For this purpose the rod 19 is stepped and is threaded at opposite ends as at 19ᶜ and 19ᵈ to receive nuts 50 and 51 between which extend the generally cone-shaped members 52 and 53, made of a suitable insulating material such as porcelain or other vitreous material, for example, these members being apertured as at 54 (see also Figure 7).

Interposed between the adjacent larger-diametered ends of the insulating members 52 and 53 is the inwardly directed flange 55 of a metal sleeve-like casting 56, the upper insulating member 52 extending upwardly within this metal sleeve 56. With the nuts 50 and 51 tightened down or screwed down toward each other, the insulating members 52 and 53 with the flange 55 of the sleeve 56 are securely and rigidly clamped therebetween.

Preferably, also, and for a purpose later hereindescribed, sheet metal corona caps 57 and 58 extend about the upper and lower ends of the interior portion of the lower rod 19, extending about the latter and about the nuts 50 and 51, respectively, being clamped and held in position by the latter.

Figure 8:
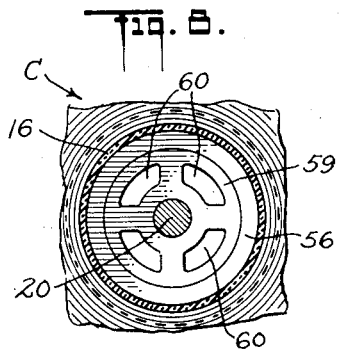
Figure 8 is a plan view as seen substantially along the line 8—8 of Figure 6 showing one of the supporting members.

The assembly of these parts having been completed and the upper interior portion of the metal sleeve 56 having been threaded, a metal disk 59 (Figures 6 and 8) is threaded into the sleeve 56 and driven home. The metal disk member 59 is apertured as at 60 and its central portion is threaded to receive the lower end of the upper rod 20, which may now be threaded and locked thereto.

The lower end of rod 19 (Figure 6) is provided with the collar or bushing 25 above described in connection with Figure 1 and the rod assembly 20—19 as just described is inserted into the casing 17 of Figure 6 until collar 25 rests against the inside face of the bottom wall 17$^b$, whereby the height of a laterally and horizontally extending flange 61 at the lower end of the metal sleeve 56, above the bottom wall 17$^b$ is determined and thereby, by any suitable means, the location of the interior side brackets 27 (Figures 6 and 7) determined so as to bring the upper faces of these brackets into the same plane and into the plane of the upper surface of the condenser supporting flange 61.

The rod assembly may now be removed from the casing 17 and the brackets 27 fixed in position.

Now the metal sleeve 56 has an outside diameter sufficiently small to be snugly received within the hollow core 16 of the condenser C and the latter is thereupon slipped down over the sleeve 56, the insulating beams or bars 28 (Figures 6 and 7) being interposed between the under face of the condenser C and the supporting ledge or flange 61, as was described above in connection with Figures 1 and 2.

Thereupon the apertured disk-like supporting member 29 above described in connection with Figures 1 and 2 is slipped onto rod 20, its vertical flange fitting inside the condenser core 16 and its horizontal flange overlapping the upper face of the latter; a nut 30 is now threaded onto the stepped threaded portion of upper rod 20 and screwed down to the requisite degree to clamp condenser C and the insulating beams 28 between the upper metal member 29 and the lower flange 61 of the metal sleeve 56, thus rigidly supporting the condenser C from the axially alined rod assembly 19—20.

With the condenser and related parts thus mounted and secured to the rod assembly 19—20, these parts are now let down into the casing 17, lower rod 19 passing through the hole 26 in the bottom wall 17$^b$ to bring the collar 25 to rest against the inside face of the bottom wall 17$^b$, thus positioning the supporting surface of the flange 61 in alinement with the supporting faces of the inside brackets 27 onto which the outer apertured ends of the insulating beams 28 come to rest, being secured thereto by the threaded studs 32 and nuts 33, as was described above in connection with Figures 1 and 2.

The lower end of rod 19 may now be sealed in its opening, as by welding, as at 36. The connections 34 and 35 (Figure 6) of the condenser C to the upper rod 20 and to the side wall of the casing 17 may now be made as was above described in connection with Figure 1, whereupon the assembly thus far achieved is ready to receive the insulating closure disk-like cover 37 with related parts, all as was already above described in connection with Figures 1, 2, 9 and 10, thus hermetically sealing the enclosure and thus encasing the condenser C with its liquid insulating medium.

Figure 11:
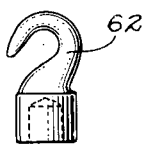
Figures 11 and 12 are side elevations of possible forms of parts that may be employed to mechanically interconnect capacitor units.
Figure 12:
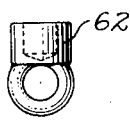

To the threaded ends 19$^a$ and 20$^a$ of the rods 19 and 20, projecting as they do below and above the assembled apparatus, may now be attached suitable connecting or mounting devices. These may take any desired form. For example, they may take the form of hook and eye members 62, such as shown in Figures 11 and 12, or they may take the form of a disk-like member 63, as shown in Figures 13 and 14, the member 63 being provided with a hub portion 63$^a$ for threaded engagement with the threaded ends of the rods and with a side flange 63$^b$, apertured as at 64, these two forms of devices being in particular illustrative of devices meeting two typical and illustrative requirements in practical use.

For example, where it is desired to suspend one or more capacitor units from a suitable support, such as a cross-arm 65 (see Figure 15) of a transmission line, pole, or tower 66, I utilize the hook-shaped members 62, by means of which as many capacitor units 67, like those above described in detail, may be hooked together or suspended one from the other, the lowermost hook supporting a cable or conductor clamp 68 which in turn has secured to it the high voltage conductor 69. Thus, one or more of these capacitor units may be formed into a chain, being, by the interhooked engagement, automatically connected in series relation, the number of capacitors thus employed being suited to meet the particular circuit, voltage, or other requirements. As best shown in Figure 15, in actual use the capacitor units are subjected to strain. It should be noted, however, that the rod assembly unit 19—20 carries this strain and that there is no strain upon the cover 37, the condenser C or the casing 17.

Figure 13:
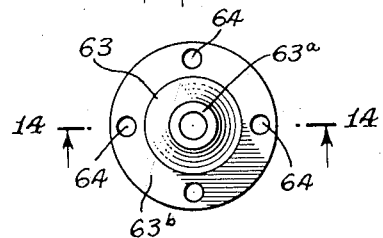
Figures 13 and 14 are respectively plan and central vertical sectional views of another form of part that may be used for interconnecting capacitor units.
Figure 14:
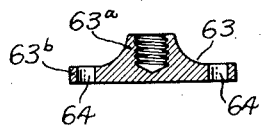

As illustrating another requirement which my invention meets, reference may now be made to Figure 16 wherein one or more capacitor units 67 are stacked one upon the other, the exposed threaded ends of the rods 19 and 20 being provided with the disk members 63 of Figures 13 and 14 which, when brought face to face may be mechanically connected as by bolts 68. The lowermost disk member 63 of the lowermost capacitor unit 67 may be secured to a suitable foundation or support 71. The threaded end 20$^a$ of the rod 20 projects from the uppermost capacitor unit 67 and may be used directly for electrically and mechanically connecting thereto the high tension conductor or cable 70.

In the arrangement of Figure 16, the capacitor units are interposed in such a way as to function as compression members but here again the forces of compression, as was the case of the strains of tension in Figure 15, are transmitted from one rod assembly of one capacitor unit onto the rod assembly of the next unit, and so on, all without subjecting other parts, such as the ceramic insulator cover, the casing, or the condenser itself, to such strains or forces.

Before pointing out certain unique features of action and advantages, certain of the many and varied possible practical applications of capacitors such as embody my invention may be briefly considered. For example, where it is desired to obtain a relatively low voltage, for power purposes, from a high tension transmission line, the mechanical and electrical arrangements of Figures 15 and 16 may be employed, considering the conductor 69 of Figure 15 and the conductor or cable 70 of Figure 16 to be the high tension transmission line itself or an electrical connection thereto, assuming that, for purposes of illustration, single phase power is to be supplied to the load. In such case, a suitable number of capacitors 67 are mechanically and electrically arranged in series, as already above described in connection with Figures 15 and 16, whereupon referring now to Figure 15, the load 72, diagrammatically indicated, may be supplied with single phase power from the transmission line of which conductor 69 forms a part by bridging the load 72, through conductors 73 and 74 across the endmost (uppermost in Figure 15) capacitor 67. In such case the potential across the circuit 73—74 and hence the potential supplied to the load 72 will be such a fraction of the total voltage as is the voltage drop across the thus shunted capacitance 67 to the voltage drop across all of the serially connected capacitances 67. Figure 17 shows diagrammatically the circuit arrangement just described in connection with Figure 15, the transmission tower 65—66 being, of course, grounded.

For tapping off of the high tension line a low voltage energy supply with the arrangement of Figure 16, the desired capacitance at that end of the serially related capacitors 67 most remote from the high tension conductors 70 is shunted by conductors 75—76 and supplied to the load 72, and in Figure 16 (as was true also of the above assumed example with respect to Figures 15 and 17) it was assumed that only one capacitor 67 supplies the capacitance adequate to give the desired load-circuit voltage.

Figure 18:
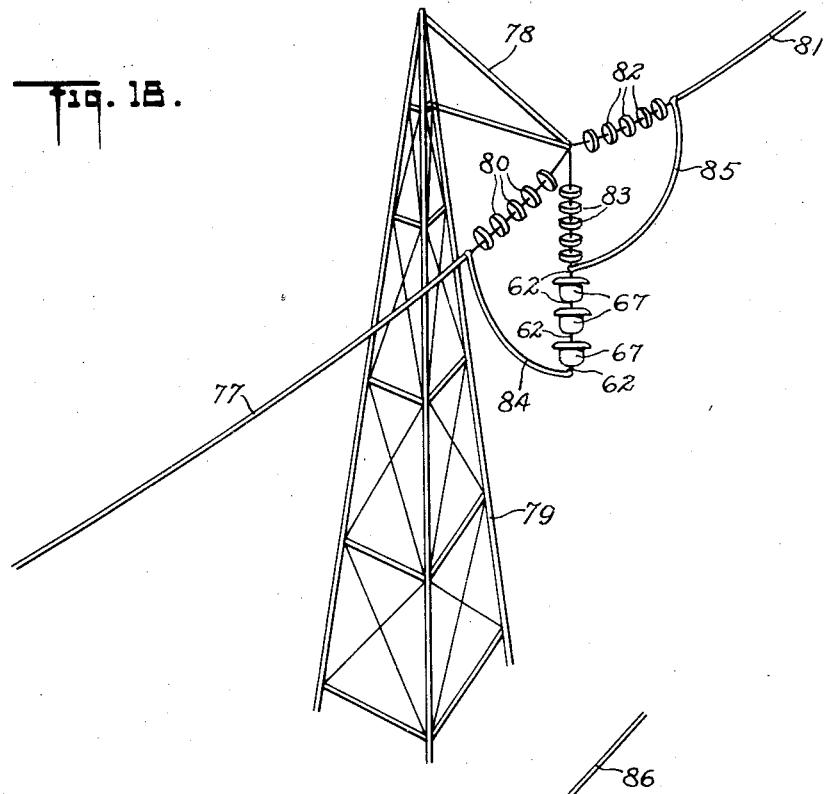
Figure 18 is a perspective view illustrating a form of possible installation of my capacitor units in a high tension transmission line for accomplishing certain functions or purposes in the latter.

In Figure 18 I have schematically shown an installation of capacitors of my invention for voltage regulation and surge absorption in one of the conductors of a high tension transmission line, it being, of course, understood that the installation may be duplicated for as many conductors as make up the transmission circuits. The high tension conductor 77 in which the capacitors are to be serially related is dead-ended at the arm 78 of the tower 79, through any suitable suspension insulator or insulators 80, while on the other side of the tower, the circuit is continued by way of conductor 81 which is likewise dead-ended through the suspension insulator or insulators 82, the insulators 80—82 thus interrupting the line conductor 77—81.

From the same arm 78 hangs a suspension insulator or insulators 83 (of substantially the same insulating characteristics as the insulators 80—82, as will be clear from what follows) and from this insulator 83 I suspend as many capacitor units 67, like those above mentioned in connection with Figures 15 and 16, for example, as is necessary, considering of course the capacitance of the condensers C (see Figures 1 and 6) within the capacitor units 67, to give the desired effect for the purpose to be achieved, the capacitor 67 being suspended one from the other in chain fashion as in Figure 15. A connecting conductor 84 connects the line conductor 77 to the lower terminus 62 of the lowermost capacitor 67 and a connecting conductor 85 connects the upper terminal 62 of the uppermost capacitor 67 to the line conductor 81, thus inserting the capacitors 67—67 etc. in series in the line.

Figure 19:
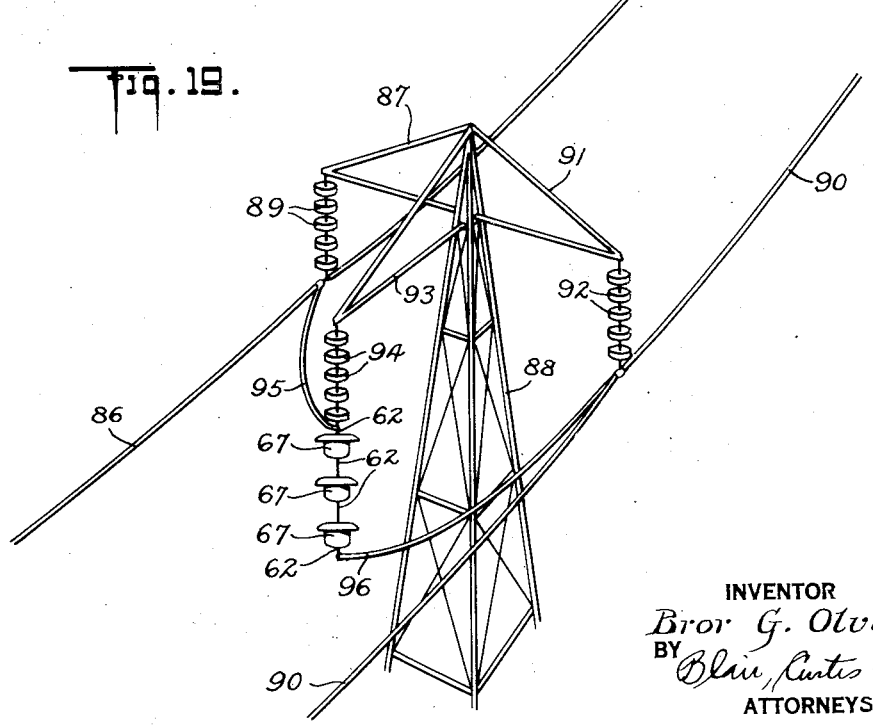
Figure 19 is a perspective view showing another possible form of installation of my capacitor unit in a transmission line.

In Figure 19 I have schematically shown an installation of the capacitors of my invention for power factor correction or surge absorption, the capacitors being bridged across the line, the latter being illustratively assumed to be a single phase line. Thus, one side of the high tension circuit may comprise conductor 86 suspended from the arm 87 of the transmission tower 88 by means of a suitable insulator or insulators 89 while the other side of the circuit may comprise the conductor 90 suspended from the arm 91 of the tower 88 by insulator or insulators 92. An intermediate arm 93 of the tower, conveniently extending at right angles to the plane of the arms 87—91, suspends a suitable number of capacitor units 67 by way of the insulator or insulators 94, the capacitors 67 being, as will be clear from what has above been set forth, electrically connected in series by the mechanical connections which arrange them in a chain. Of course the number of capacitors 67 is suitably selected, having due regard for the capacitance of the condensers C therein (Figures 1 and 6) to serve the purpose of the particular installation. A conductor 95 connects the uppermost terminal 62 of the uppermost capacitor 67 to one side 86 of the high tension line and a conductor 96 connects the lowermost terminal 62 of the lowermost capacitor unit 67 to the other side 90 of the high tension circuit 86—90, thus bridging the serially connected capacitances directly across the high tension circuit.

Though I have above illustrated and described several possible installations employing my capacitor construction, it is to be understood that such illustrated and described installations are only a few of the numerous applications in practice in which the many advantages and features of action and construction provided by my invention may be achieved and I do not intend, because of the illustration of such several of the numerous possible installations to be limited thereto, particularly inasmuch as these several illustrations will suffice to make clear, particularly in view of the ensuing further discussion, certain other unique features of action and advantages of my invention.

For example, it will be noted that, when and where associated with a high tension transmission line, the capacitor must function outdoors and is thus subjected to the elements. In this connection certain important actions and coactions take place. For example, referring to Figures 1 and 6, the upper rod 20 is effectively insulated from the casing 17 by the disk-like combined cover and insulator 37, the latter being suitably proportioned, as by having a sufficiently large diameter with respect to the diameter of the casing 17, to provide the desired insulation and length of surface leakage path. Thus, for example, the insulator-cover 37 (see Figure 1 or 6) may overlap the casing 17 peripherally, as at 37ª, and the under side of the overlapping portion 37ª thereof may be petticoated or ribbed as at 37ᵇ, thus providing a construction that is dependable and effective under the varying conditions of atmosphere and weather.

Moreover, the insulating medium within the capacitor, preferably oil, with which the capacitor is filled to a level indicated by the line 49, as already above noted, partakes of a thoroughly efficient heat transferring action in that the spaces above and below the condenser C are joined by the annular passage or space 18 between the condenser C and the side wall 17ª of the metal casing 17 and are also joined by the central passage or passages through the cylindrical core 16 of the condenser C, the passages 21ʰ (see Figure 5) in the member 21 and the apertures or passages 29ʰ (Figure 4) in the member 29 insuring the free and ready flow of liquid cooling and insulating medium through the central passage provided by the core 16. Thus the oil or other dielectric and cooling medium that may be employed may freely circulate into contact with the relatively large exposed areas of the condenser C, thus to withdraw heat therefrom, and also into contact with the relatively large area of the metal walls 17a and 17b of the metal casing 17 itself, thus insuring a rapid and efficient transfer of the heat from the medium to the metal walls (which are good heat conductors) for dissipation exteriorly of the casing 17, the latter, it being further noted, providing a large exposed area for such heat dissipation.

In connection with the action of the cooling and insulating medium, and recurring to the changes in temperature to which the capacitor may be subjected in practice, it will be noted that the space provided above the oil level 49 provides an elastic medium that permits freedom of expansion and contraction of the liquid medium without subjecting the construction to undesired or abnormal internal pressures or stresses. This space is preferably filled with an inert gas such as nitrogen, at atmospheric pressure.

Furthermore, the joints between the insulator-cover 37 and related parts are positioned above the oil level 49 and thus leakage of liquid medium at any possible rupture of such joints is dependably precluded.

A significant and important feature of the construction, already indicated above, resides in the arrangement, described in detail above, whereby the insulator-cover 37, its sealed connection with the casing 17, and other parts, are dependably freed from being subjected to tensional or compression strains that result from the mounting or suspension of the capacitor itself. The central rod assemblies 19—20 and immediately related parts take up tensional or compression strains and stresses, the rod assembly freely sliding, when necessary, either under such strains or stresses or under the action of expansions or contractions due to temperature changes, relative to the cover member 37 itself, through the bushing or metal part 40 of which it freely passes, while the bellows 41 maintains a sealed but flexible joint between the relatively sliding parts throughout whatever relative movement therebetween may take place. By these features of construction and action many other advantages are achieved; for example, the insulator 37 need not be constructed, designed, shaped or related so as to withstand any such strains or stresses; in other respects, also, the construction generally is greatly simplified and inexpensive and rapid manufacture, together with highly dependable and reliable action achieved.

With such features of my invention as above described, I am, moreover, enabled to eliminate what have heretofore been unsurmounted limitations in the construction, action and application of capacitors, particularly for such uses as are above mentioned. It has been impossible to construct capacitor units for commercial purposes exceeding 3 kva. rating. Chief among the limiting factors has been the use of porcelain shells which, in the known constructions, serve both as insulators and for supporting the weight of the apparatus. Since the porcelain is not well adapted to serve this mechanical function and, furthermore, is a poor conductor of heat, an increase in rating would require an excessive increase in the weight of the porcelain which would prevent the necessary dissipation of heat.

I, however, do away with all these limitations and am enabled far to exceed prior practice and achievements; for example, I am enabled to construct capacitors of ratings of, for example, 50 kva. This I am enabled to do for various reasons which will now be clear in view of what has been set forth in detail above. For example, I make it possible to avoid having to depend upon the poor heat conducting or radiating properties of porcelain, even though, for other considerations, I prefer actually to employ porcelain or similar ceramic material in the construction. I am thus enabled to achieve high efficiency of heat dissipation, utilizing, as will now be clear, large heat dissipating surfaces of metal, metal being an excellent heat conductor. Moreover, my invention makes it possible to employ a construction of great mechanical strength without subjecting the condenser dielectric (porcelain in heretofore known constructions) to the mechanical strains and stresses to which the structure is subjected in actual use. According to the present invention, the individual capacitor can be made as large as is desired entirely without respect to the weight factor involved, for the mechanical suspending or supporting portions or parts of my construction can be made of whatever mechanical strength is necessary without imposing any limitation upon the purely electrical parts of the capacitor.

These advantages are of great practical importance, bearing as they do upon certain further effects or results. For example, I have indicated in Figures 15, 16 and 17 and have above described how a low voltage load may be supplied from a high tension circuit or transmission line with low voltage energy. Now the amount of energy that can be supplied to such a low voltage load in this manner is dependent directly upon the kva. rating of the capacitor employed in such a system and while it has heretofore been possible to operate only relays, meters, or similar very low energy-consuming devices, I am enabled to do away with the limitations of prior practice and to provide a system and apparatus in which genuine and substantial power loads may be supplied at low voltage from high tension transmission lines or circuits.

It will thus be seen that there has been provided in this invention a system and apparatus in which the various objects heretofore set forth, together with many thoroughly practical advantages are successfully achieved. It will be seen that the construction is of a thoroughly practical character and is well adapted to meet the widely varying conditions of hard practical use.

As many possible embodiments may be made of the above invention, and as many changes might be made in the embodiment above set forth, it is to be understood that all matter hereinbefore set forth or shown in the accompanying drawings, is to be interpreted as illustrative and not in a limiting sense.

I claim:

1. In high voltage condenser construction, in combination, two-ended supporting means comprising two elongated metal parts and insulating means for mechanically interconnecting said parts at their adjacent ends, a metallic casing having side and bottom walls, the bottom wall having a substantially central aperture and one of said parts extending into said aperture and being secured and sealed to said bottom wall and the other of said parts projecting outwardly through the open end of said casing, a condenser within said casing, one terminal of said condenser being in electrical connection with said outwardly projecting part and the other terminal being in electrical connection with said casing, said condenser being spaced from the walls of said casing and having at least one passage therethrough, said supporting means extending through said passage without closing the latter, a liquid dielectric and cooling medium within said casing and within which said condenser is submerged, for movement through said passage and the spaces between said condenser and said casing walls and for thereby transferring heat from said condenser to said casing, a combined closure and insulating member closing the open end of said casing and having an aperture therein through which said outwardly projecting part freely passes, and a flexible metallic member exterior of said closure and insulating member and sealed both to the latter and to said outwardly projecting part, whereby said insulating member is relieved of strains to which said supporting means may be subjected.

2. In high voltage condenser construction, in combination, two-ended supporting means comprising two elongated metal parts and insulating means for mechanically interconnecting said parts at their adjacent ends, a metallic casing having side and bottom walls, one of said parts being secured to said bottom wall and the other of said parts projecting outwardly through the open end of said casing, a condenser within said casing, one terminal of said condenser being in electrical connection with said outwardly projecting part and the other terminal being in electrical connection with said casing, said condenser being spaced from the walls of said casing and having at least one passage therethrough, said supporting means extending through said passage without closing the latter, a liquid dielectric and cooling medium within said casing and within which said condenser is submerged, for movement through said passage and the spaces between said condenser and said casing walls and for thereby transferring heat from said condenser to said casing, said insulating means being shorter than the depth of said casing and having external leakage paths from one metal part to the other to safely insulate said two parts against surface leakage therebetween at the potential of operation of said condenser, an insulating member made of a ceramic material extending across the open end of said casing, said member having an aperture through which said outwardly projecting metallic part freely extends, means forming a sealed connection between said ceramic member and said casing, and means forming a sealed connection between said ceramic member and said outwardly projecting metallic part and for maintaining the connection therebetween sealed throughout relative movement between said outwardly projecting part and said ceramic member.

3. In high voltage condenser construction, in combination, two-ended supporting means comprising two elongated metal parts and insulating means for mechanically interconnecting said parts at their adjacent ends, a metallic casing having side and bottom walls, one of said parts being secured to said bottom wall and the other of said parts projecting outwardly through the open end of said casing, a condenser within said casing, one terminal of said condenser being in electrical connection with said outwardly projecting part and the other terminal being in electrical connection with said casing, said condenser being spaced from the walls of said casing and having at least one passage therethrough, said supporting means extending through said passage without closing the latter, a liquid dielectric and cooling medium within said casing and within which said condenser is submerged, for movement through said passage and the spaces between said condenser and said casing walls and for thereby transferring heat from said condenser to said casing, a combined closure and insulating member made of a ceramic material for closing the open end of said casing, said closure member having an aperture therein larger than the cross-section of said outwardly projecting part and through which the latter projects, a metallic bushing about said last-mentioned part and sealed into the aperture in said ceramic member, and means forming a yieldable but sealed connection between said bushing and said outwardly projecting part.

4. In condenser construction, in combination, a two-ended supporting means comprising two elongated metal parts and insulating means for mechanically interconnecting said parts at their adjacent ends, one of said parts carrying a plurality of members spaced lengthwise of said part, an electric condenser engaged between said two members, and means electrically connecting the terminals of said condenser respectively to said two metal parts, whereby any yielding of said insulating means under strain of said supporting means is not transmitted to said condenser.

5. In condenser construction, in combination, a two-ended condenser supporting and connecting means comprising two elongated metal parts and insulating means for mechanically interconnecting said parts at their adjacent ends, one of said parts carrying a plurality of members spaced lengthwise of said part, and an electric condenser having its terminals in electrical connection respectively with said two metal parts and being engaged between said two members, whereby any yielding of said insulating means under strain of said supporting means is not transmitted to said condenser, one of said members being mounted to be capable of movement toward or away from the other, and means for drawing and holding said movable part toward the other and thereby to clamp said condenser therebetween.

6. In condenser construction, in combination, a supporting structure for assuming strains of tension or compression comprising two rod-like parts of metal substantially alined axially, one of said parts having secured thereto at its end adjacent the end of the other of said two parts transversely extending means provided with a seat, insulating means secured to the adjacent end of said other of said two parts and mechanically related to and interlocked with said seat, an electrical device having its terminals connected respectively to said two metal parts of said supporting structure, and means whereby said electrical device is related to said transversely extending means for support therefrom.

7. In condenser construction, in combination, a supporting structure for assuming strains of tension or compression comprising two rod-like parts of metal substantially alined axially, insulating means secured to the adjacent end of one of said parts, the adjacent end of said other part being threaded, means in interlocked relation with said insulating means and in threaded engagement with said threaded end of said part and having means for engaging an electrical device, and means supported by said supporting structure and coacting with said engaging means for holding said electrical apparatus in place.

8. In condenser construction, in combination, a supporting structure for assuming strains of tension or compression comprising two rod-like parts of metal substantially alined axially, insulating means secured to the adjacent end of one of said parts, the adjacent end of said other part being threaded, and means in interlocked relation with said insulating means and in threaded engagement with said threaded end of said parts and having means for engaging an electrical device.

9. In condenser construction, in combination, an annular condenser construction having ring-like means at its opposed ends for supporting engagement therewith, a supporting structure for said ring-like means comprising two rod-like parts of metal substantially alined axially, the terminals of said condenser construction being in electrical connection respectively with said two metal parts, one of said parts being in engagement with both of said ring-like means, means for insulatingly and mechanically connecting the other of said metal parts to one of said ring-like means, the engagement of said ring-like means with one of said metal parts relieving the condenser from the effects of yielding of said insulating means under strains to which said supporting structure is subjected.

10. In condenser construction, in combination, an annular condenser construction having ring-like means at its opposed ends for supporting engagement therewith, a supporting structure for said ring-like means comprising two rod-like parts of metal substantially alined axially, the terminals of said condenser construction being in electrical connection respectively with said two metal parts, one of said parts being in engagement with both of said ring-like means, one of said ring-like means having seat-forming means, insulating means related to said seat-forming means, means mechanically connecting the other of said metal parts to said insulating means, the engagement of said ring-like means with one of said metal parts relieving the condenser from the effects of yielding of said insulating means under strains to which said supporting structure is subjected.

11. In condenser construction, in combination, an annular condenser construction having ring-like means at its opposed ends for supporting engagement therewith, a supporting structure for said ring-like means comprising two rod-like parts of metal substantially alined axially, one of said parts being in engagement with both of said ring-like means, one of said ring-like means having seat-forming means, and means insulatingly interlocking the other of said metal parts to said seat-forming means.

12. In high voltage condenser construction, in combination, two ended supporting means comprising two elongated metal parts and insulating means for mechanically interconnecting said parts at their adjacent ends, a metallic casing having side and bottom walls, one of said parts being secured to said bottom wall and the other of said parts projecting outwardly through the open end of said casing, a condenser within said casing, one terminal of said condenser being in electrical connection with said outwardly projecting part and the other terminal being in electrical connection with said casing, said condenser being shaped to extend about said supporting means, supporting means for said condenser including means mechanically relating the latter to said first-mentioned supporting means, and also including means mechanically relating the condenser to a wall of the casing, and a closure member of insulating material closing the open end of said casing and having an aperture therethrough through which said outwardly projecting part freely passes, said insulating closure member and said insulating dielectric means being dielectrically in parallel and hence both being subjected to the voltage of the condenser with the former constructed to insulate the parts between which it is interposed under exposed or outdoor conditions and the latter constructed to insulate the parts between which it is interposed under the conditions existing within said casing.

13. In combination, a metallic container having side and bottom walls, a cover mounted upon said container having a hole therein, a strain-assuming means extending freely through said hole and attached to the bottom wall of said container, said strain-assuming means comprising two metallic members attached to each other at their adjacent ends by an insulating unit, said insulating unit comprising a flat metal ring to which one of said metallic members is attached, two substantially frusto-conical members having their bases mounted upon the opposite sides of said flat ring, the frusto-conical members having axial holes therein in line with the center of the ring, the other of said metallic members extending through said holes in said frusto-conical members and said ring, means upon said other member which hold the conical portions against the ring and thus hold the insulating unit in assembled relationship, and of an electrical unit mounted within said container upon said strain-assuming means, two terminals upon said electrical unit, one of said terminals being electrically connected to each of said metallic members.

14. In combination, an elongated supporting means formed of two axially positioned metallic rods held together and insulated from each other at their adjacent ends by an insulating unit, spaced rings mounted upon one of said metallic rods, a metallic container mounted upon the other of said rods having side and bottom walls, a cover of insulating material mounted upon said metallic container, a condenser element mounted within said container between said spaced rings, a flexible seal between said one metallic rod and said cover.

15. In combination, an elongated supporting means formed of two axially aligned metallic members held together and insulated from each other at their adjacent ends by an insulating unit, spaced rings mounted upon one of said metallic members, a metallic container mounted upon the other of said members having side and bottom walls, a cover of insulating material mounted upon said metallic container, a condenser mounted within said container between said spaced rings and carried by said spaced rings, two terminals upon said condenser, one terminal being electrically connected with said one metallic member and the other of said terminals being electrically connected with said other metallic member.

16. In combination, an elongated supporting means formed of two axially positioned metallic members held together and insulated from each other at their adjacent ends by an insulating unit, spaced rings mounted upon one of said metallic members, a metallic container mounted upon the other of said members having side and bottom walls, a cover of insulating material mounted upon said metallic container, a condenser mounted within said container between said spaced rings and carried by said spaced rings, a guide ring fixedly mounted upon said cover around said one of said metallic members, a flexible seal between said cover and said one of said metallic members, said guide ring and flexible seal allowing said one of said metallic members to freely move in an axial direction.

17. In condenser construction, the combination of, a strain structure comprising two rod-like metallic members in substantial alignment and means insulatingly and mechanically interconnecting said members, an electrical condenser construction having an aperture therethrough, said strain structure passing through said aperture, means mounted upon said strain structure engaging said condenser adjacent the ends of the hole therethrough, a casing mounted upon said strain structure surrounding said condenser, radial bars extending from said condenser support means to said casing to associate said strain-assuming means, said condenser and said casing.

18. In condenser construction, the combination of, a strain structure comprising two rod-like metallic members in substantial alignment and means insulatingly and mechanically interconnecting said members, an electrical condenser construction having an aperture therethrough, said strain structure passing through said aperture, means mounted upon said strain structure engaging said condenser adjacent the ends of the hole therethrough, a casing mounted upon said strain structure surrounding said condenser, radial bars extending from said condenser support means to said casing to associate said strain-assuming means, said condenser and said casing, said casing comprising a metallic shell having side and bottom walls and having a cover of insulating material, said condenser having two terminals one of which is electrically connected to each of said rod-like members.

19. In condenser construction wherein a plurality of condenser units are supported one by another and each unit includes a supporting structure, a condenser element and a casing, the combination of, a pair of elongated supporting elements in end-to-end relationship and an insulating unit connecting said elements at their adjacent ends, said insulating unit including a supporting member rigidly attached to one of said elements and solid dielectric means contacting the opposite sides of said supporting member, the other of said elements extending through and contacting the opposite sides of said dielectric means.

BROR G. OLVING.